United States Patent
Muhanna et al.

(10) Patent No.: US 10,412,056 B2
(45) Date of Patent: Sep. 10, 2019

(54) ULTRA DENSE NETWORK SECURITY ARCHITECTURE METHOD

(71) Applicant: Futurewei Technologies, Inc., Plano, TX (US)

(72) Inventors: Ahmad Shawky Muhanna, Richardson, TX (US); Zhibi Wang, Woodridge, IL (US); Jiangsheng Wang, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 202 days.

(21) Appl. No.: 15/213,266

(22) Filed: Jul. 18, 2016

(65) Prior Publication Data
US 2017/0026347 A1    Jan. 26, 2017

Related U.S. Application Data

(60) Provisional application No. 62/196,667, filed on Jul. 24, 2015.

(51) Int. Cl.
*G06F 21/00* (2013.01)
*H04L 29/06* (2006.01)
(Continued)

(52) U.S. Cl.
CPC ........ *H04L 63/0428* (2013.01); *H04L 63/065* (2013.01); *H04L 63/083* (2013.01); *H04W 12/04* (2013.01); *H04W 12/06* (2013.01)

(58) Field of Classification Search
CPC . H04L 63/0428; H04L 63/083; H04L 63/065; H04W 12/06; H04W 12/04
See application file for complete search history.

(56) References Cited

U.S. PATENT DOCUMENTS

2014/0171091 A1    6/2014    Cai et al.
2015/0126154 A1    5/2015    Yang
(Continued)

FOREIGN PATENT DOCUMENTS

CN    101232731 A    7/2008
CN    102740289 A    10/2012
(Continued)

OTHER PUBLICATIONS

"3rd Generation Partnership Project; Technical Specification Group Services and System Aspects; 3GPP System Architecture Evolution (SAE); Security architecture (Release 12)," 3GPP TS 33.401, V12.5.1, Oct. 2012, 121 pages.
(Continued)

*Primary Examiner* — Kendall Dolly
(74) *Attorney, Agent, or Firm* — Slater Matsil, LLP

(57) ABSTRACT

A method for establishing a trust relationship in an ultra dense network is provided. The method comprises receiving, by a user equipment (UE), a reconfiguration request from a macrocell; deriving, by the UE, a user plane encryption key according to information in the reconfiguration request; transmitting, by the UE, a first user plane signaling message to a first microcell in a group of microcells when the UE is attached to the first microcell; and transmitting, by the UE, a second user plane signaling message to a second microcell in the group of microcells when the UE is attached to the second microcell, wherein the first user plane signaling message and the second user plane signaling message are both encrypted according to the user plane encryption key.

17 Claims, 6 Drawing Sheets

(51) Int. Cl.
*H04W 12/06* (2009.01)
*H04W 12/04* (2009.01)

(56) References Cited

U.S. PATENT DOCUMENTS

2016/0127897 A1* 5/2016 Lee .................. H04L 63/06
713/176
2016/0249210 A1* 8/2016 Chang ................ H04W 12/04

FOREIGN PATENT DOCUMENTS

| | | | |
|---|---|---|---|
| CN | 103959829 A | 7/2014 | |
| CN | 104349312 A | 2/2015 | |
| WO | 2014113686 A2 | 7/2014 | |
| WO | 2014120077 A1 | 8/2014 | |
| WO | 2015015300 A2 | 2/2015 | |
| WO | 2015066406 A2 | 5/2015 | |
| WO | WO-2015062097 A1 * | 5/2015 | ............ H04W 12/04 |

OTHER PUBLICATIONS

3GPP TSG-RAN2 Meeting #81, "Discussion on minimizing UE context transfer and signalling to CN," R2-130572, Intel Corporation, Jan. 28-Feb. 1, 2013, 6 pages, St. Julian's, Malta.
3rd Generation Partnership Project; Technical Specification Group Services and System Aspects; Generic Authentication Architecture (GAA); Generic Bootstrapping Architecture (GBA) (Release 12), 3GPP TS 33.220, V12.3.0, Jun. 2014, 92 pages.

\* cited by examiner

ULTRA DENSE NETWORK SECURITY ARCHITECTURE METHOD

This patent application claims priority to U.S. Provisional Application No. 62/196,667, filed on Jul. 24, 2015 and entitled "Ultra Dense Network Security Architecture and Method," which is hereby incorporated by reference herein as if reproduced in its entirety.

TECHNICAL FIELD

The present invention relates to a network security architecture and method, and, in particular embodiments, to an ultra dense network security architecture and method.

BACKGROUND

The use of Ultra Dense Networks (UDNs) is anticipated to be one of the 5G architectural solutions for providing high speed services with high quality of service (QoS) and quality of experience (QoE) in highly populated areas. In a UDN, a plurality of small cells or microcells may be deployed within the coverage area of a large cell or macrocell. Because the coverage of a microcell is limited compared with that of a macrocell, it is possible for a user equipment (UE) to move from one microcell to another very frequently, which may increase the number of microcells with which the UE needs to have a security trust relationship.

SUMMARY

An embodiment method for establishing a trust relationship in an ultra dense network includes receiving, by a user equipment (UE), a reconfiguration request from a macrocell; deriving, by the UE, a user plane encryption key according to information in the reconfiguration request; transmitting, by the UE, a first user plane signaling message to a first microcell in a group of microcells when the UE is attached to the first microcell; and transmitting, by the UE, a second user plane signaling message to a second microcell in the group of microcells when the UE is attached to the second microcell, wherein the first user plane signaling message and the second user plane signaling message are both encrypted according to the user plane encryption key.

An embodiment UE includes a processor and a non-transitory computer readable storage medium storing programming for execution by the processor. The programming includes instructions for receiving, by the UE, a reconfiguration request from a macrocell; deriving, by the UE, a user plane encryption key according to information in the reconfiguration request; transmitting, by the UE, a first user plane signaling message to a first microcell in a group of microcells when the UE is attached to the first microcell; and transmitting, by the UE, a second user plane signaling message to a second microcell in the group of microcells when the UE is attached to the second microcell, wherein the first user plane signaling message and the second user plane signaling message are both encrypted according to the user plane encryption key.

An embodiment computer program product includes a non-transitory computer readable storage medium storing programming. The programming includes instructions to receive a reconfiguration request from a macrocell; derive a user plane encryption key according to information in the reconfiguration request; transmit a first user plane signaling message to a first microcell in a group of microcells when a UE is attached to the first microcell; and transmit a second user plane signaling message to a second microcell in the group of microcells when the UE is attached to the second microcell, wherein the first user plane signaling message and the second user plane signaling message are both encrypted according to the user plane encryption key.

An embodiment secure macrocell group includes a first microcell and a second microcell. The first microcell is configured to receive a secure microcells group key and further configured to transmit user plane signaling to a UE when the UE is attached to the first microcell, wherein the signaling is encrypted according to a user plane encryption key derived by the first microcell according to the secure microcells group key. The second microcell is configured to receive the secure microcells group key and further configured to transmit user plane signaling to the UE when the UE is attached to the second microcell, wherein the signaling is encrypted according to the user plane encryption key derived by the second microcell according to the secure microcells group key.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In the current 4G Long Term Evolution (LTE) architecture, both the control plane (CP) signaling and the user plane (UP) signaling are anchored at a macrocell, e.g., an enhanced node B (eNB). Thus, any UE attached to an Evolved Packet System (EPS) is usually anchored at a single eNB with both CP and UP associated with the same eNB.

When a UE is anchored over a microcell and both the control plane and the user plane are anchored at that microcell, the procedures for the UE to attach to the microcell are similar to those where the UE attaches to a macrocell.

The vast majority of the eNB activities while serving a specific UE involve handling the UE user plane traffic. In densely populated areas, e.g., shopping malls, stadiums, etc., the user plane traffic may be offloaded to multiple small microcells through the use of a 5G Ultra Dense Network (UDN) architecture. UDNs generally anchor the control plane air interface signaling at a macrocell, e.g., an eNB in 4G, and anchor user plane traffic on a microcell or small cell. The same UE/user may have multiple user plane flows that are anchored at different microcells while the control plane is anchored at the macrocell. It is also possible that a small amount of control signaling may be needed between the UE and the microcell for maintaining the user plane session that is being anchored.

Figure 1:
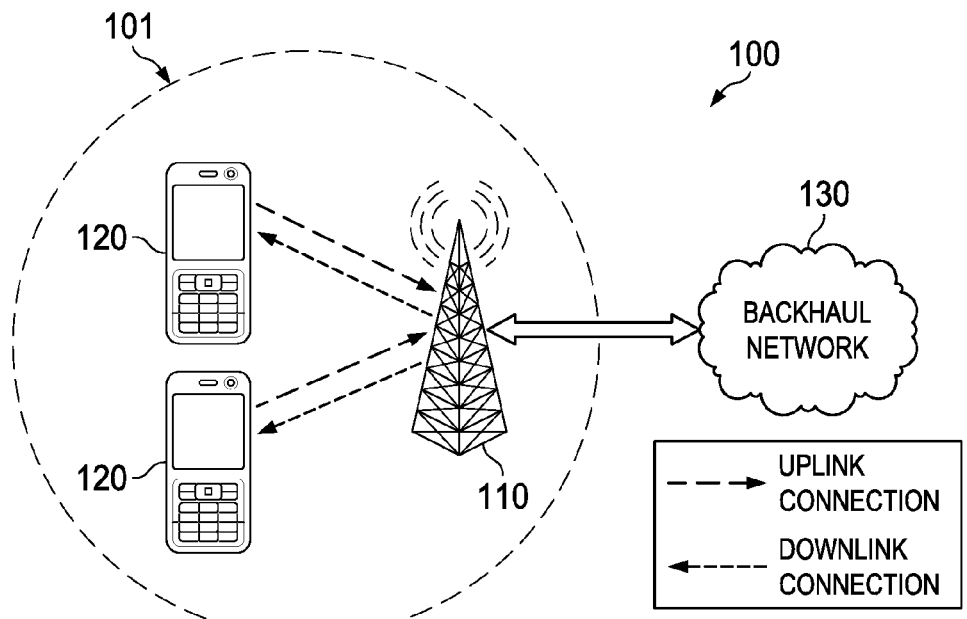
FIG. 1 illustrates an embodiment of a network for communicating data.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macrocell, a femtocell, a Wi-Fi access point (AP), or other wirelessly enabled devices. Base stations may provide wireless access in accordance with one or more wireless communication protocols, e.g., LTE, LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

While specific embodiments described herein primarily utilize the terms "macrocell" and "microcell" for the communications controllers, embodiments are generally applicable to access points (APs) as communications controllers. Thus, the term "access point" may be used for the macrocells and microcells described herein. Furthermore, in some embodiments, the control plane may be anchored by a microcell or an access point in general, and the user plane may be anchored by a macrocell or an access point in general.

Figure 2:
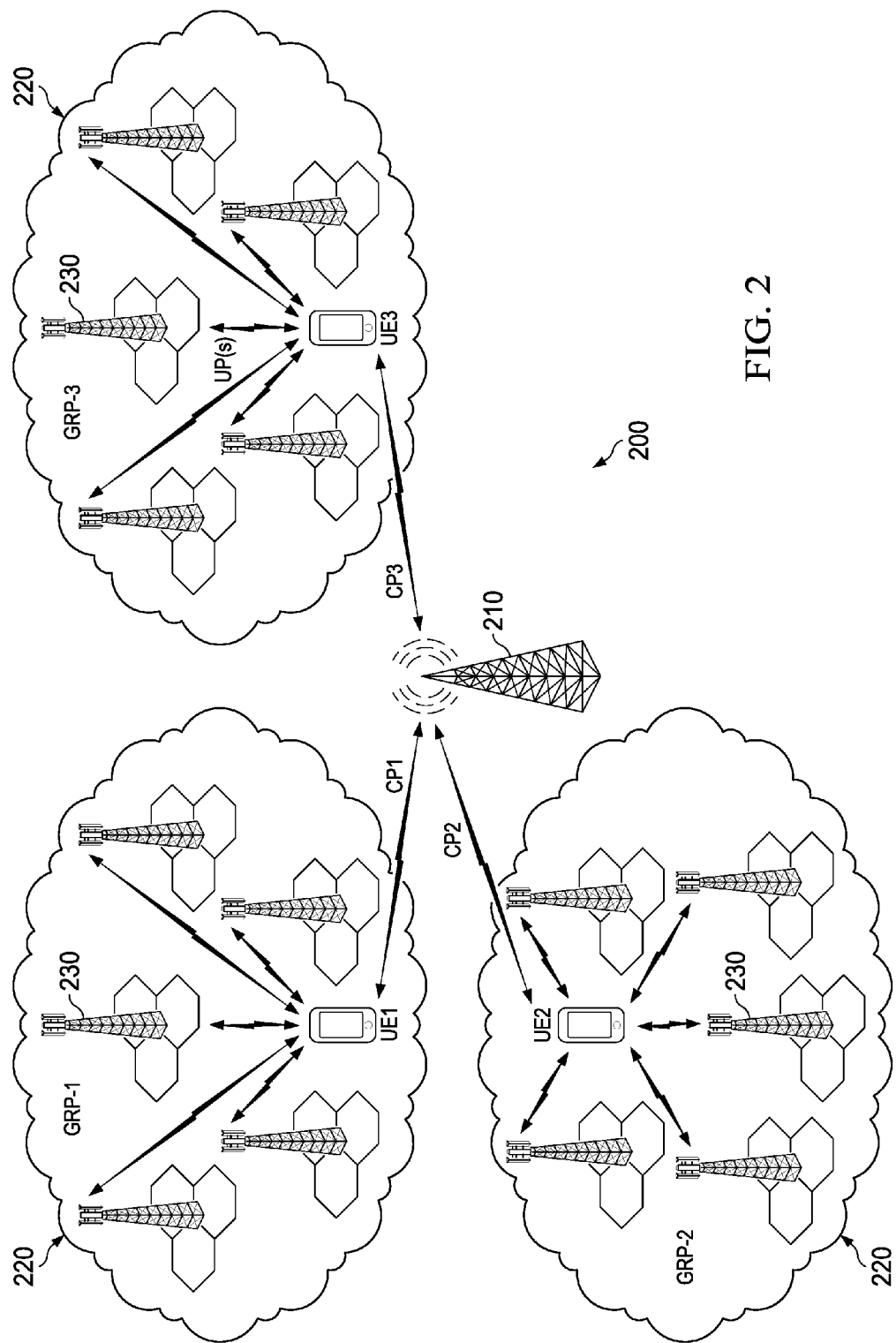
FIG. 2 illustrates an embodiment of a UDN security architecture.

FIG. 2 illustrates an embodiment of a UDN architecture 200. In this architecture, control plane signaling is anchored at a macrocell 210, which in 4G is referred to as an eNB. User plane traffic is anchored at a plurality of microcells groups 220, each of which includes a plurality of microcells, such as microcells 230.

In such an architecture, a UE may have a single trust relationship with the eNB, which may cover both the control plane and the user plane at the same time. That is, all user plane traffic may be protected by a single security trust relationship between the UE and the eNB. Thus, if that trust relationship is compromised, then all the UE user plane traffic and flows may be compromised at once.

In 5G, the control plane continues to be protected with the security trust relationship between the UE and the eNB. For user plane traffic, a different trust relationship may be established between the UE and each of a plurality of microcells associated with the eNB. Maintaining multiple simultaneous user plane trust relationships in such a manner may not be efficient. A 5G architecture that handles densely populated areas with a UDN may call for the use of an optimized security architecture that reduces the burden on the UE in order to avoid maintaining a large number of security trust relationships when the UE user plane traffic is anchored at different microcells.

An embodiment provides a security architecture that maintains the same security trust relationship for all microcells within a group of microcells. That is, a new trust model is provided, wherein the trust relationship between a UE and a microcell within a specific group of microcells is the same as the trust relationship between the UE and any other microcell within that specific group of microcells. When the UE has multiple user plane flows, each anchored at a different microcell, the UE may have a single security trust relationship, i.e., security association, for all of the user plane flows. Thus, when a UE attaches to a 5G architecture where the UDN architecture is present, the UE maintains a single security trust relationship with each microcell in a group of microcells, instead of a different security trust relationship with each microcell in the group. When a user plane flow moves from a source microcell to a target microcell in the same group as the source microcell, the UE continues to have the same security trust relationship with the target microcell as the UE had with the source microcell. Also, if the UE maintains a user plane flow with a first microcell in a group and then attaches an additional user plane flow to a second microcell in the same group, the UE has the same security trust relationship with the second microcell as with the first. In general, once a UE has derived a key for secure communication with a microcell in a group of microcells, the UE may use the same key for secure communication with any other microcell in the group of microcells.

As used herein, terms such as "group" and "group of microcells" may refer to a set of microcells that have been defined as a group for reasons other than security considerations or may refer to a set of microcells that have been defined as a group specifically due to security considerations. A microcell may belong to a single group of microcells or to multiple groups of microcells. When multiple microcell groups are associated with a macrocell, the macrocell may be aware of which microcells belong to which groups. A UE may determine the group to which a microcell belongs based on information transmitted by that microcell or by the macrocell associated with that microcell or based on information the UE receives in some other manner.

In an embodiment, all microcells in a group of microcells may have the same security capabilities and criteria at all times. A group of microcells may be located within the same geographical area. The number of microcells within a given microcell group may be less than a defined maximum. In addition, all microcells in a microcell group may belong to the same operator.

In an embodiment, a group of microcells may be assigned a globally unique identifier (ID). A group of microcells that share a globally unique ID and the same security criteria and characteristics may be referred to as a secure microcells group (SMG). When a UE has a trust relationship or security association with a specific SMG, then the same trust relationship and security association may be valid with all microcells that are part of the SMG. In an embodiment, a UE may have a single security relationship with an SMG. In another embodiment, the UE may have more than one security association with the same SMG. Each SMG may have a single trust relationship with any visiting UE without introducing any security weaknesses or vulnerabilities relative to 4G architecture.

Figure 3:
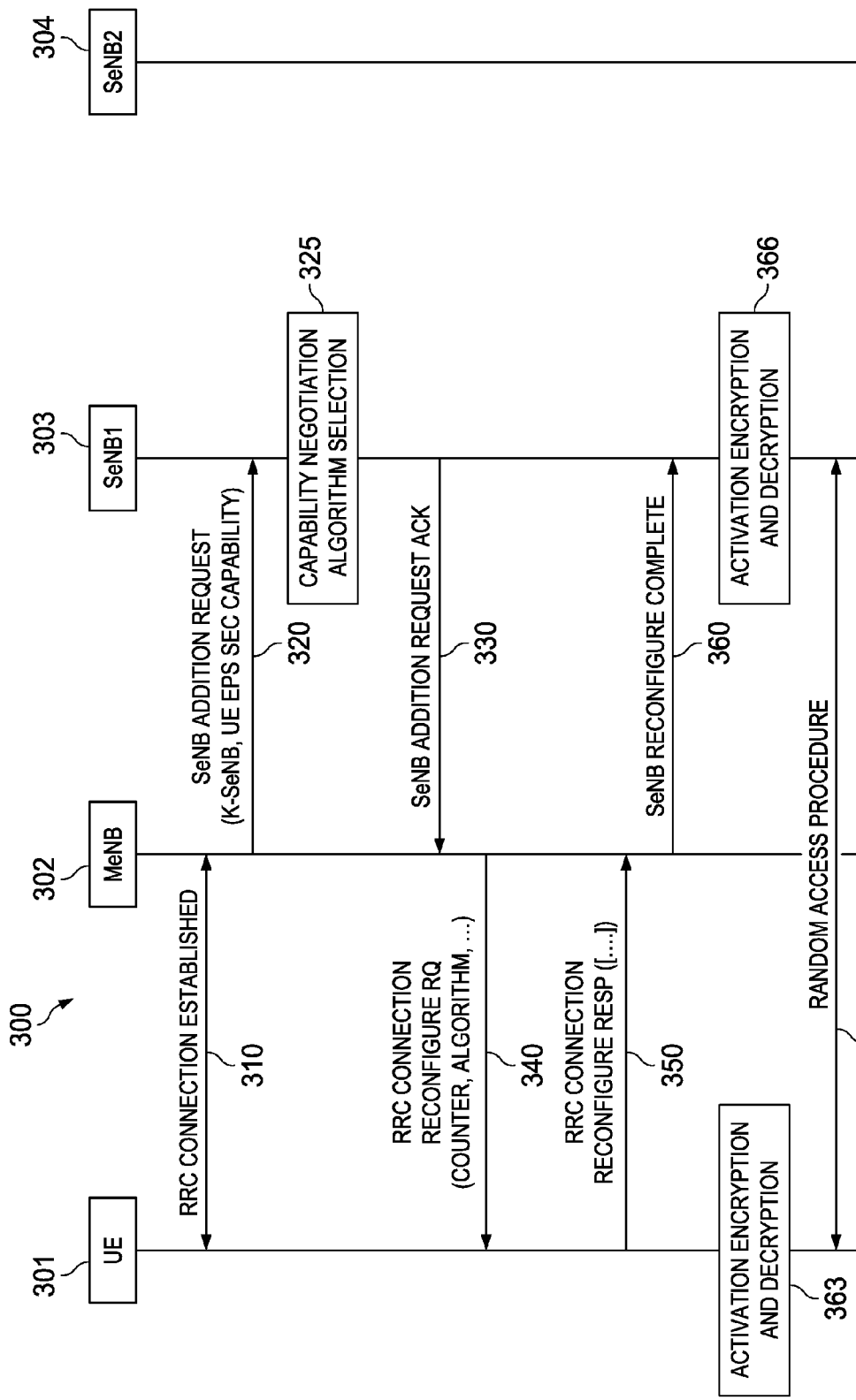
FIG. 3 illustrates signaling used to establish a security trust relationship between a UE, a master eNB and a secondary eNB according to the prior art.

FIG. 3 illustrates a protocol diagram of a conventional communications sequence 300 for establishing a security trust relationship between a UE 301, a master eNB (MeNB) 302, and a first secondary eNB (SeNB1) 303. The communications sequence 300 begins when a Radio Resource Control (RRC) connection 310 is established between the UE 301 and the MeNB 302. Next, the MeNB 302 sends an SeNB Addition Request 320 to SeNB1 303. The SeNB Addition Request 320 may include K-SeNB, which is a master key for a specific pair of a UE and an SeNB. The SeNB Addition Request 320 may also include the UE's EPS security capabilities. Upon receiving the SeNB Addition Request 320, SeNB1 303 performs a capability negotiation and an algorithm selection 325. Thereafter, SeNB1 303 sends an SeNB Addition Request Acknowledgement 330 to the MeNB 302. The MeNB 302 then sends an RRC Connection Reconfigure Request 340 to the UE 301. The RRC Connection Reconfigure Request 340 may include a counter, an algorithm, and other information needed for the UE 301 to generate a key. The UE 301 then sends an RRC Connection Reconfigure Response 350 to the MeNB 302. The MeNB 302 then sends an SeNB Reconfiguration Complete message 360 to SeNB1 303. The UE 301 and SeNB1 303 then perform activation encryption and decryption, at blocks 363 and 366 respectively, using the generated key. The UE 301 and SeNB1 303 then perform a random access procedure 370. That is, the UE 301 and SeNB1 303 acquire the air interface resources needed for communication with one another and communicate securely using the encryption and decryption based on the generated key.

Figure 4:
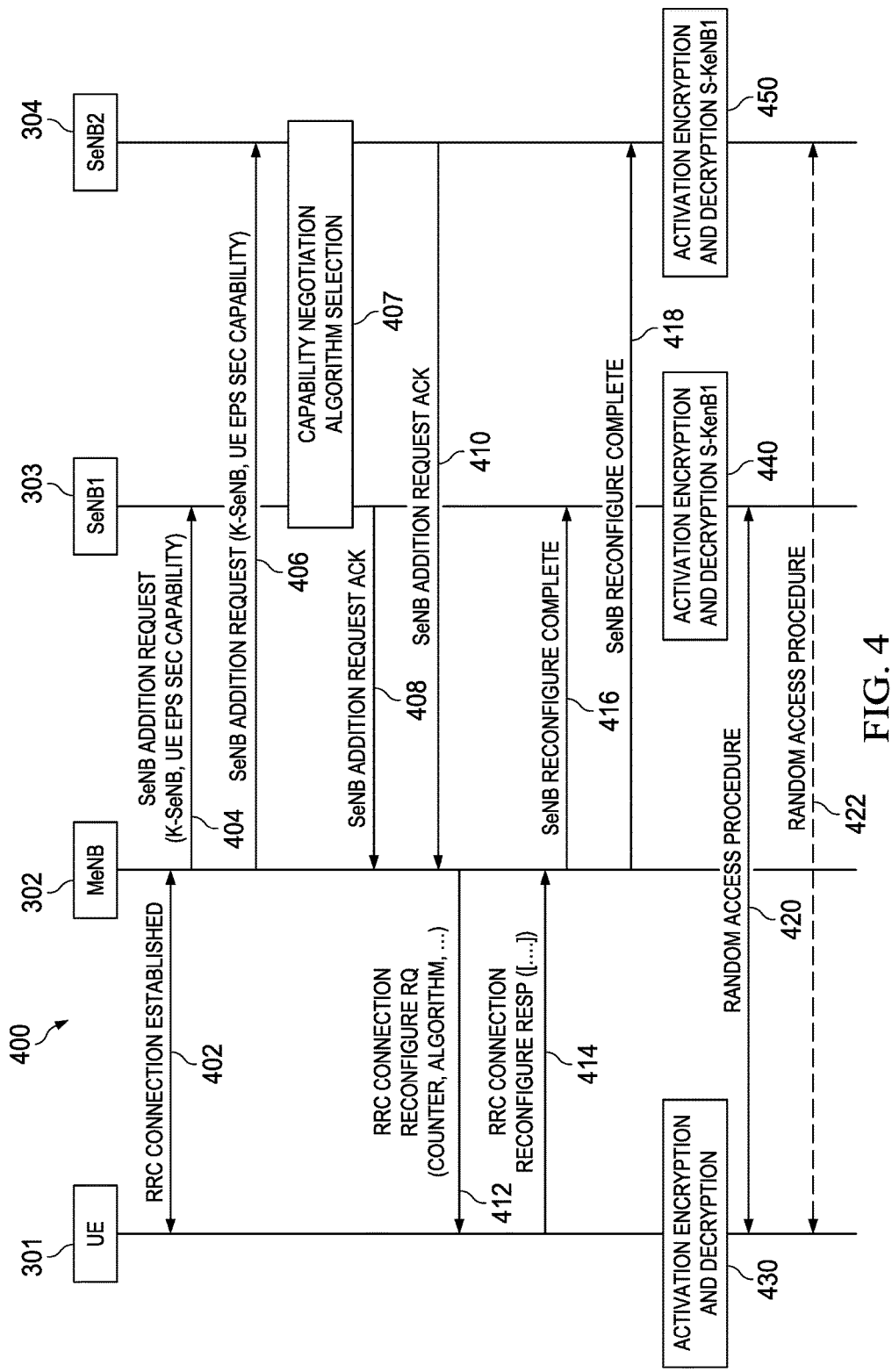
FIG. 4 illustrates an embodiment of signaling used to establish a security trust relationship between a UE, a master eNB and a plurality of secondary eNBs.

FIG. 4 illustrates a protocol diagram of an embodiment of a communications sequence 400 for establishing a security trust relationship between a UE 301, a master eNB 302, a first secondary eNB 303, and a second secondary eNB 304 according to the procedures disclosed herein. A Radio Resource Control (RRC) connection 402 is established between the UE 301 and the MeNB 302, and the MeNB 302 sends an SeNB Addition Request 404 to SeNB1 303 as described above. The MeNB 302 also sends an SeNB Addition Request 406 to at least one additional SeNB, here labeled SeNB2 304. Like the SeNB Addition Request 404 sent to SeNB1 303, the SeNB Addition Request 406 sent to SeNB2 304 may include K-SeNB and the UE's EPS security capabilities. SeNB1 303 and SeNB2 304 then perform a capability negotiation and an algorithm selection 407. Based on the information in the SeNB Addition Request 404 and the SeNB Addition Request 406 and on the results of the capability negotiation and algorithm selection 407, SeNB1 303 and SeNB2 304 may derive a user plane encryption key for secure communication with the UE 301. SeNB1 303 and SeNB2 304 then send SeNB Addition Request Acknowledgements 408 and 410 to the MeNB 302. The MeNB 302 then sends an RRC Connection Reconfigure Request 412 to the UE 301. The RRC Connection Reconfigure Request 412 may include a counter, an algorithm, and other information needed for the UE 301 to generate the same user plane encryption key derived by SeNB1 303 and SeNB2 304. The other information may include an ID for the SMG to which SeNB1 303 and SeNB2 304 belong. The UE 301 may then derive the user plane encryption key according to the information in the RRC Connection Reconfigure Request 412. The UE 301 then sends an RRC Connection Reconfigure Response 414 to the MeNB 302. The MeNB 302 then sends SeNB Reconfiguration Complete messages 416 and 418 to SeNB1 303 and SeNB2 304, respectively. The UE 301, SeNB1 303, and SeNB2 304 then perform activation encryption and decryption, at blocks 430, 440, and 450 respectively, all using the same user plane encryption key. The UE 301 and SeNB1 303 then perform a random access procedure 420. The UE 301 and SeNB2 304 may also perform a random access procedure 422. The random access procedures 420 and 422 may include the UE 301 sending user plane messages encrypted according to the user plane encryption key to SeNB1 303 and SeNB2 304.

Figure 5:
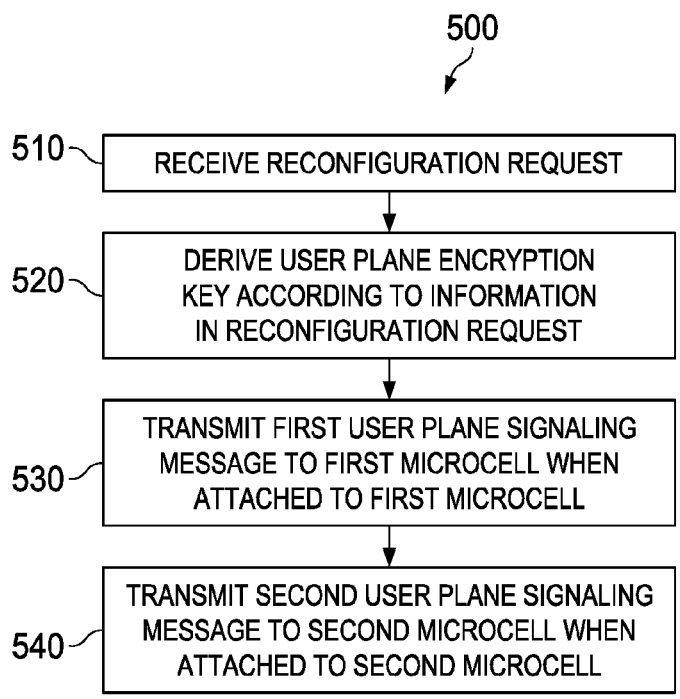
FIG. 5 illustrates a flowchart of an embodiment method for establishing a trust relationship in an ultra dense network.

FIG. 5 illustrates a flowchart of an embodiment method 500 for establishing a trust relationship in an ultra dense network, as may be performed by a UE. At step 510, the UE receives a reconfiguration request from a macrocell. At step 520, the UE derives a user plane encryption key according to information in the reconfiguration request. At step 530, the UE transmits a first user plane signaling message to a first microcell in a group of microcells when the UE is attached to the first microcell. At step 540, the UE transmits a second user plane signaling message to a second microcell in the group of microcells when the UE is attached to the second microcell. In an embodiment, the first user plane signaling message and the second user plane signaling message are both encrypted according to the user plane encryption key.

In an embodiment, the procedures for deriving a key for the microcells in an SMG may be an enhancement of the 4G key derivation procedure. In the 4G key derivation procedure, a mobility management entity (MME) receives a key known as $K_{asme}$ from a home subscriber server (HSS) for a specific UE. $K_{asme}$ is the master key for a specific pair of a UE and an MME that is acting as an Access Security Management Entity (ASME). The MME typically derives a key known as $K_{eNB}$ based on $K_{asme}$. $K_{eNB}$ is the master key for the communication between an eNB and a specific UE.

In an embodiment, the MME derives an additional key for all microcells in an SMG. This key, which may be referred to as $K_{smg}$ or the key for an SMG, is a master key between a UE and a group of microcells or secondary eNBs in an SMG. In some cases, $K_{smg}$ may reflect the identity of an SMG.

The techniques the MME uses to generate $K_{smg}$ and cause $K_{smg}$ to be transmitted to the microcells in an SMG may depend on the 5G architecture for handling the UDN architecture and approach. The techniques may not change the current security architecture when the UE control plane and user plane are anchored at the same macrocell.

In some circumstances, the MME may be aware of all SMGs that belong to a specific eNB, the members of each SMG, and the ID of each SMG. In such circumstances, the MME may be capable of communicating directly with each of the microcells in each SMG associated with the eNB. In an embodiment, when such circumstances exist, the MME may generate a different $K_{smg}$ key for each SMG based on $K_{asme}$. The MME may then communicate the respective $K_{smg}$ keys directly to every microcell in the corresponding SMG. Alternatively, $K_{smg}$ may be communicated to a leader microcell in an SMG and/or to the leader's backup, and one or both of those microcells may communicate $K_{smg}$ to the rest of the microcells in the SMG. After receiving $K_{smg}$ in either of the above manners, each microcell in an SMG may use $K_{smg}$ to protect user plane traffic for a specific UE, e.g., for purposes of encryption/decryption, authentication, verification, and/or other security procedures between the UE and each microcell in the SMG.

Figure 6:
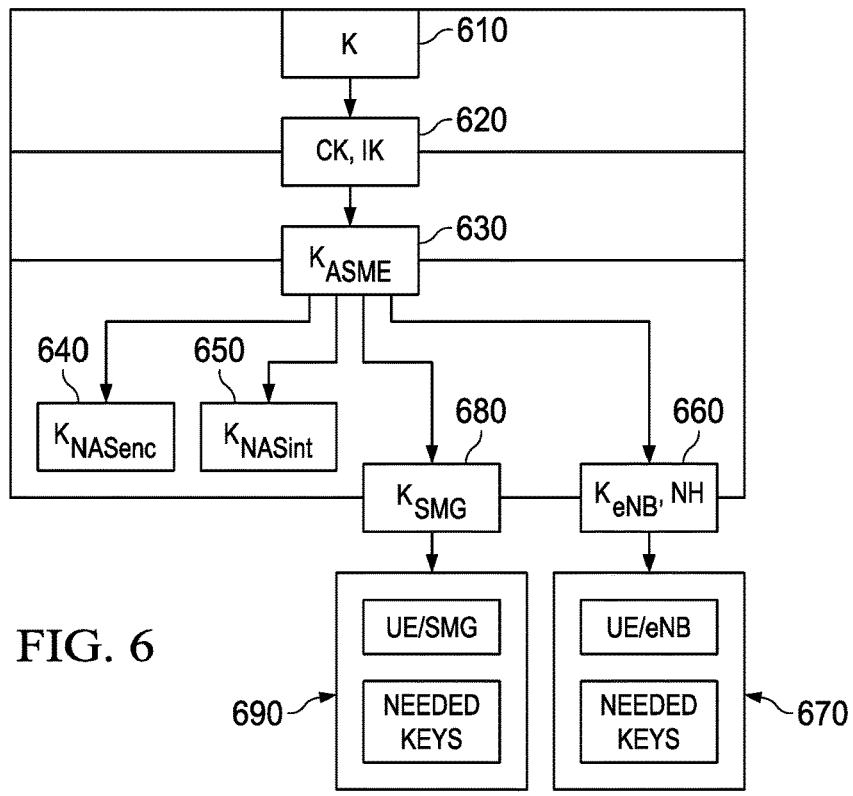
FIG. 6 illustrates an embodiment of a UDN architecture that allows an MME to communicate with microcells.

FIG. 6 is a diagram of an embodiment scheme for deriving $K_{smg}$ when the MME is capable of communicating directly with the microcells. At block 610, a master key (K) is generated and may reside in an HSS and in a UE's Universal Subscriber Identity Module (USIM). At block 620, the UE and the HSS generate a ciphering key (CK) and an integrity protection key (IK) based on K. At block 630, the UE and the HSS generate $K_{asme}$ based on CK and IK. The HSS may then send $K_{asme}$ to an MME. At block 640, a key for non-access stratum (NAS) signaling encryption ($K_{NASenc}$) is generated for a pair of the UE and the MME based on $K_{asme}$. At block 650, a key for NAS signaling integrity protection ($K_{NASint}$) is generated for the pair of the UE and the MME based on $K_{asme}$. At block 660, the MME generates $K_{eNB}$ for the UE and an eNB associated with the UE based on $K_{asme}$. At block 670, $K_{eNB}$ is used to generate the keys needed for secure communication between the UE and the eNB. In an embodiment, at block 680, the UE and the MME independently generate $K_{smg}$ based on $K_{asme}$. In the manner described above, the MME then provides $K_{smg}$ to the microcells in the SMG for which $K_{smg}$ was generated. In an embodiment, at block 690, the UE and the microcells in the SMG use the independently derived versions of $K_{smg}$ to generate the keys needed for secure user plane communication between the UE and the microcells. In particular, the UE and the microcells may generate a user plane encryption key based on $K_{smg}$.

In some circumstances, the MME communicates directly only with the macrocell. That is, the MME communicates with an eNB but does not communicate directly with the microcells in each SMG associated with the eNB. In an embodiment, when such circumstances exist, the MME may generate a general SMG key for all the SMGs that belong to the eNB. The general SMG key may be similar to $K_{eNB}$ and may be based on $K_{asme}$ and on a common identifier for all the SMGs. The MME may then transmit the general SMG key to the eNB. The eNB may then generate an individualized $K_{smg}$ for each SMG based on the general SMG key and on the ID for each SMG. Each individualized $K_{smg}$ may be associated with a specific group of microcells. The eNB may then communicate each individualized $K_{smg}$ to its respective SMG. The eNB may send an individualized $K_{smg}$ to each microcell in an SMG or to a leader and/or backup microcell in the SMG, and either or both of those microcells may then send the individualized $K_{smg}$ to the other microcells in the SMG. Each microcell may then use $K_{smg}$ to protect user plane traffic for a specific UE, e.g., for purposes of encryption/decryption, authentication, verification, and/or other security procedures between the UE and each microcell in the SMG.

Figure 7:
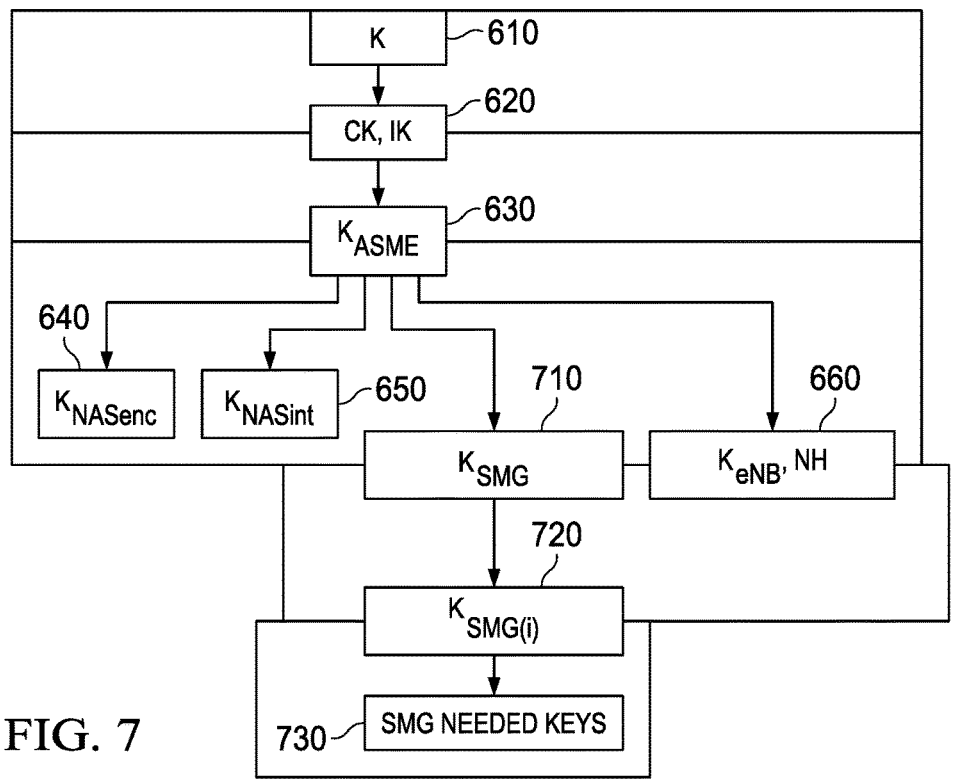
FIG. 7 illustrates an embodiment of a UDN architecture that allows an eNB to communicate with microcells.

FIG. 7 is a diagram of an embodiment scheme for deriving $K_{smg}$ when the MME communicates with an eNB but does not communicate directly with the microcells. K 610, CK/IK 620, $K_{asme}$ 630, $K_{NASenc}$ 640, $K_{NASint}$ 650, and $K_{eNB}$ 660 are generated and used as described with regard to FIG. 6. In this embodiment, the MME and the UE do not separately generate a specific $K_{smg}$ for each SMG associated with the eNB, as in block 680 of FIG. 6. Instead, the MME and the UE, at block 710, separately generate a general $K_{smg}$ for all SMGs associated with a particular eNB based on $K_{asme}$ and on a common ID for all the SMGs. At block 720, the eNB generates a different individualized $K_{smg}$ for each SMG associated with the eNB based on the general $K_{smg}$ and on the respective ID for each SMG. The eNB then sends the individualized $K_{smg}$ keys to the associated SMGs. At block 730, the UE also generates the individualized $K_{smg}$ key corresponding to the individualized $K_{smg}$ key received by the SMG associated with the UE. The UE and the microcells in the SMG then use the independently derived versions of $K_{smg}$ to generate the keys needed for secure user plane communication between the UE and the microcells. In particular, the UE and the microcells may generate a user plane encryption key based on $K_{smg}$.

The procedures depicted in FIG. 4 have been depicted separately from the procedures depicted in FIGS. 6 and 7, but the steps depicted in the three figures may be components in an overall method for establishing a trust relationship in an ultra dense network. An example of such an overall method will now be described, but it should be understood that the steps do not necessarily occur in the order described below. In this example, it will be assumed for the sake of simplicity that only one SMG is present.

The method may be considered to begin when a UE establishes a connection, such as an RRC connection, with an MeNB. A master key, K, for the UE is then generated and stored in the UE and an HSS. The UE and the HSS each separately generate a ciphering key, CK, and an integrity protection key, IK, based on K. Based on CK and IK, the UE and the HSS each separately generate a master key, $K_{asme}$, for the pair of the UE and an MME associated with the UE and the HSS. The HSS then sends $K_{asme}$ to the MME. Based on $K_{asme}$, the MME generates $K_{eNB}$, which is a key for communication between the UE and the MeNB. In an embodiment, the MME also generates, also based on $K_{asme}$, a key for communication between the UE and the SeNBs in an SMG, and this key may be referred to as $K_{smg}$. In some cases, $K_{smg}$ may reflect the identity of an SMG.

The MME causes $K_{smg}$ to be transmitted to the SeNBs in one of several ways. If the MME is capable of communicating directly with the SeNBs, the MME may send $K_{smg}$ to all of the SeNBs in the SMG. Alternatively, the MME may send $K_{smg}$ to only one of the SeNBs, which then sends $K_{smg}$ to the other SeNBs in the SMG. If the MME is capable of communicating with the MeNB but is not capable of communicating directly with the SeNBs, the MME generates a generic version of $K_{smg}$ and sends the generic version of $K_{smg}$ to the MeNB. The MeNB then generates an individualized version of $K_{smg}$ for the SMG based on the generic version of $K_{smg}$ and on the ID of the SMG. The MeNB then sends the individualized version to the SeNBs. If other SMGs were present, the MeNB would generate a different individualized version of $K_{smg}$ for each of the SMGs.

The MeNB also informs the SeNBs of the UE's security capabilities. In the case where the MeNB sends $K_{smg}$ to the SeNBs, the MeNB may send the security capabilities information to the SeNBs in the same message in which the MeNB sends $K_{smg}$ to the SeNBs. In the case where the MME sends $K_{smg}$ to the SeNBs, the MeNB may send the security capabilities information to the SeNBs in some other manner.

Based on $K_{smg}$ and the UE's security capabilities, the SeNBs select an algorithm to be used to derive a key for secure communication between the SeNBs and the UE. The algorithm may be a Key Derivation Function (KDF) or a similar algorithm. The SeNBs also select a unique counter to be used as input into the algorithm. Alternatively, a group ID for the SMG could be used instead of a counter. At this point, all SeNBs in the SMG have the same $K_{smg}$, counter, and ID for the algorithm.

The SeNBs then send the algorithm ID and the counter to the MeNB, and the MeNB sends the algorithm ID and the counter to the UE. The MeNB may transmit that information in a Reconfiguration Request message in RRC signaling.

At some point, the UE generates $K_{smg}$ based on $K_{asme}$, which the UE had previously generated as described above. Since the UE uses the same inputs and same procedures used by the HSS in generating $K_{asme}$, the version of $K_{asme}$ generated by the UE is the same as the version of $K_{asme}$ that the HSS sent to the MME. Thus, the version of $K_{smg}$ that the UE generates based on $K_{asme}$ is the same as the version of $K_{smg}$ that the MME generates and causes to be transmitted to the SeNBs. Therefore, at this point, the UE has same $K_{smg}$, counter, and algorithm ID as the SeNBs.

The UE and each of the SeNBs separately provide the same $K_{smg}$ and the same counter as input into the same algorithm, such as a KDF, and thus generate the same user plane encryption key ($KUP_{enc}$) as output. The same $KUP_{enc}$ may then be used for secure communication of user plane signaling between the UE and each of the SeNBs.

In some cases, the UE and the MME may generate other keys based on $KUP_{enc}$, $K_{asme}$, and/or other parameters. For example, the key for NAS signaling encryption, $K_{NASenc}$, and the key for NAS signaling integrity protection, $K_{NASint}$, may be generated for the UE and the MME based on $K_{asme}$. In addition, a key for RRC encryption ($KRRC_{enc}$) and a key for RRC integrity protection ($KRRC_{int}$) may be generated. $KRRC_{enc}$ and $KRRC_{int}$ may be derived from information provided to the UE that reflects the identity and protocol of RRC communication. A new counter that is dedicated for RRC communication may be used to guarantee the freshness of these keys and to ensure that the keys are different from $KUP_{enc}$, for example.

If needed for integrity protection, a user plane integrity protection key ($KUP_{int}$) may also be generated using the counter used for $KUP_{enc}$ plus an identifier to indicate that $KUP_{int}$ is for integrity protection.

In general, an identifier for an RRC protocol specific for encryption and a separate identifier specific for integrity protection may be added as input to the key derivation function. The use of an identifier that reflects the nature of the generated key may differentiate between an encryption key and an integrity protection key that are derived from the same master key.

Under the above procedures, the MeNB may still communicate the S-$K_{eNB}$ over the X2-C plane to all members of the small cell group. The SeNBs may then derive the user plane encryption key for the UE. The MeNB may then communicate an S-eNB group special counter to the UE once, and the UE may then derive the S-$K_{eNB}$ and user plane encryption keys to share with all members of the group. That is, under existing procedures, each time the UE moves from one microcell in an SMG to another or adds a microcell in the SMG for user plane traffic, the MeNB sends the UE information from which the UE may derive a new user plane encryption key for use with the new microcell. Under the embodiments disclosed herein, on the other hand, the MeNB sends such information to the UE only once as long as the UE remains in the same SMG. The UE then uses the information to derive a single user plane encryption key that may be used with all the microcells in the SMG. Thus, under the procedures disclosed herein, the amount of signaling from the MeNB to the UE may be reduced compared to the amount of signaling previously used. In particular, the RRC Connection Reconfigure Request message shown at event 550 in the prior art FIG. 5 may be sent from the MeNB to the UE multiple times, once for each time the UE moves from one microcell in an SMG to another or attaches to an additional microcell. By contrast, the RRC Connection Reconfigure Request message shown at event 614 in the embodiment of FIG. 6 may be sent from the MeNB to the UE only once, namely when the UE enters the SMG.

In 5G, it is expected that the MeNB may have more than one group of SeNBs. In such a case, the small cell group ID may be used in addition to a special counter to derive the S-$K_{eNB}$. This assumes that the small cell group ID can be communicated to the UE in a timely enough manner for the UE to make use of the small cell group ID. If communicating the small cell group ID to UE is not possible, the MeNB may ensure that the special counter is unique for a group of small cells that are associated with the MeNB. When the MeNB communicates K-$S_{eNB}$ to a group of small cells, the MeNB may inform some members of the group to keep K-$S_{eNB}$ until the UE starts the random access procedure, which may not occur immediately.

When the UE hands over from a first microcell that belongs to a first SMG to a second microcell that belongs to a second SMG, the UE automatically uses the key that belongs to the second SMG for securing user plane communication with the second microcell.

As part of the UDN architecture, it is possible for a UE to have some limited control signaling with a microcell. In this case, it is possible to use a different key to protect the control plane signaling between the UE and the microcells within each SMG. For example, there may be one control plane key per SMG, or the same user plane key may be reused.

The concept of security keys has been used herein as an example for the purposes of illustration and explanation. Other similar concepts, such as certificates, can be used and can follow the same general approach, such that each microcell in a microcell group uses the same certificate or other security component.

Various embodiments provide a security architecture solution that is based on the existing 4G LTE security architecture, but is optimized to handle UDN security architecture. Embodiments may be used for the 5G UDN security architecture. 3GPP TS 33.401 V12.5.1 (October 2012) provides further details regarding message flows/sequences utilized by the various procedures described herein.

Figure 8:
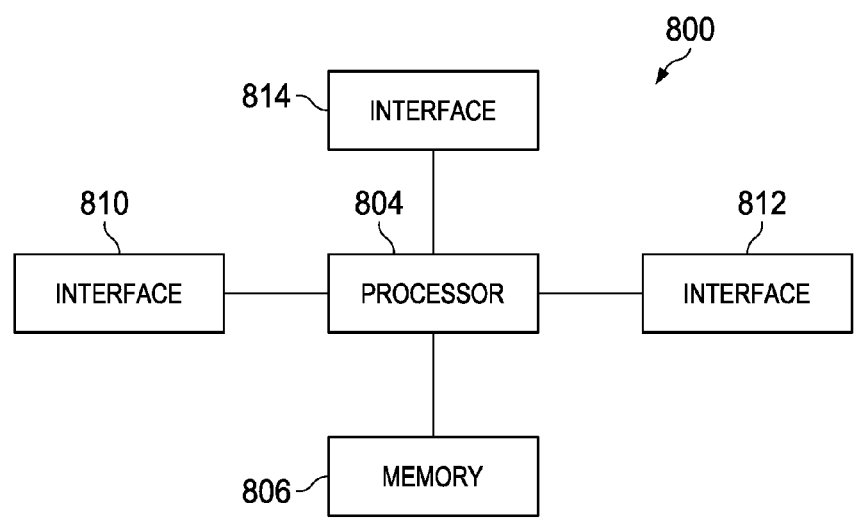
FIG. 8 illustrates a block diagram of an embodiment of a processing system for performing methods described herein.

FIG. 8 illustrates a block diagram of an embodiment processing system 800 for performing methods described herein, which may be installed in a host device. As shown, the processing system 800 includes a processor 804, a memory 806, and interfaces 810-814, which may (or may not) be arranged as shown the figure. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in the figure, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
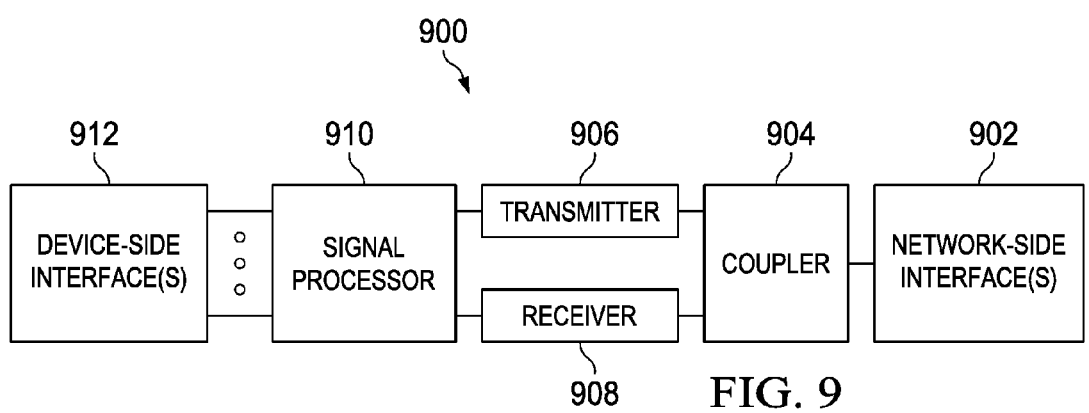
FIG. 9 illustrates a block diagram of a transceiver adapted to transmit and receive signaling over a telecommunications network.

In some embodiments, one or more of the interfaces 810, 812, 814 connects the processing system 800 to a transceiver adapted to transmit and receive signaling over the telecommunications network. FIG. 9 illustrates a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a deriving unit/module and/or a verifying unit/module. The respective units/modules may be hardware, software, or a combination thereof. For instance, one or more of the units/modules may be an integrated circuit, such as field programmable gate arrays (FPGAs) or application-specific integrated circuits (ASICs).

The following references are related to subject matter of the present application. Each of these references is incorporated herein by reference in its entirety:

3GPP TS 33.401 V12.5.1, 3rd Generation Partnership Project; Technical Specification Group Services and System Aspects; 3GPP System Architecture Evolution (SAE); Security architecture (Release 12) (October 2012).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for establishing a trust relationship in an ultra dense network, the method comprising:
   receiving, by a user equipment (UE), a reconfiguration request from a macrocell that includes a unique counter that is assigned to a group of microcells;
   encrypting, by the UE, a first user plane signaling message and a second user plane signaling message using the same user plane encryption key, wherein the user plane encryption key is derived in accordance with the unique counter;
   transmitting, by the UE, the first user plane signaling message to a first microcell in the group of microcells during a first period in which the UE is communicatively coupled to the first microcell; and
   transmitting, by the UE, the second user plane signaling message to a second microcell in the group of microcells during a second period in which the UE is communicatively coupled to the second microcell.

2. The method of claim 1, wherein the reconfiguration request includes an algorithm to be used by the UE for deriving the user plane encryption key, and wherein the unique counter is used as an input to the algorithm.

3. The method of claim 1, further comprising:
   deriving a radio resource control (RRC) encryption key (KRRCenc) according to the user plane encryption key; and
   transmitting an RRC message to the first microcell, wherein signaling in the RRC message is encrypted according to KRRCenc.

4. The method of claim 1, further comprising:
   deriving a radio resource control (RRC) integrity key (KRRCint) according to the user plane encryption key;
   receiving an RRC message from the first microcell; and
   verifying the integrity of the RRC message according to KRRCint.

5. The method of claim 1, wherein the UE receives an identity of the group of microcells from at least one of:

the first microcell;
the second microcell; and
a macrocell associated with the first microcell and the second microcell.

6. A user equipment (UE) comprising:
a processor; and
a non-transitory computer readable storage medium storing programming for execution by the processor, the programming including instructions that when executed by the processor cause the UE to:
receive a reconfiguration request from a macrocell that includes a unique counter that is assigned to a group of microcells;
encrypt a first user plane signaling message and a second user plane signaling message using the same user plane encryption key, wherein the user plane encryption key is derived in accordance with the unique counter;
transmit the first user plane signaling message to a first microcell in the group of microcells during a first period in which the UE is communicatively coupled to the first microcell; and
transmit the second user plane signaling message to a second microcell in the group of microcells during a first period in which the UE is communicatively coupled to the second microcell.

7. The UE of claim 6, wherein the reconfiguration request includes an algorithm to be used by the UE for deriving the user plane encryption key, and wherein the unique counter is used as an input to the algorithm.

8. The UE of claim 6, wherein the programming further includes instructions to:
derive a radio resource control (RRC) encryption key (KRRCenc) according to the user plane encryption key; and
transmit an RRC message to the first microcell, wherein signaling in the RRC message is encrypted according to KRRCenc.

9. The UE of claim 6, wherein the programming further includes instructions to:
derive a radio resource control (RRC) integrity key (KRRCint) according to the user plane encryption key;
receive an RRC message from the first microcell; and
verify the integrity of the RRC message according to KRRCint.

10. The UE of claim 6, wherein the UE receives an identity of the group of microcells from at least one of:
the first microcell;
the second microcell; and
a macrocell associated with the first microcell and the second microcell.

11. A computer program product comprising a non-transitory computer readable storage medium storing programming, the programming when executed includes instructions to:
receive a reconfiguration request from a macrocell that includes a unique counter that is assigned to a group of microcells;
encrypt a first user plane signaling message and a second user plane signaling message using the same a user plane encryption key, wherein the user plane encryption key is derived in accordance with the unique counter;
transmit the first user plane signaling message to a first microcell in the group of microcells during a first period in which a user equipment (UE) is communicatively coupled to the first microcell; and
transmit the second user plane signaling message to a second microcell in the group of microcells during a first period in which the UE is communicatively coupled to the second microcell.

12. The computer program product of claim 11, wherein the reconfiguration request includes an algorithm to be used by the UE for deriving the user plane encryption key, and wherein the unique counter is used as an input to the algorithm.

13. The computer program product of claim 11, wherein the programming further includes instructions to:
derive a radio resource control (RRC) encryption key (KRRCenc) according to the user plane encryption key; and
transmit an RRC message to the first microcell, wherein signaling in the RRC message is encrypted according to KRRCenc.

14. The computer program product of claim 11, wherein the programming further includes instructions to:
derive a radio resource control (RRC) integrity key (KRRCint) according to the user plane encryption key;
receive an RRC message from the first microcell; and
verify the integrity of the RRC message according to KRRCint.

15. The computer program product of claim 11, wherein the UE receives an identity of the group of microcells from at least one of:
the first microcell;
the second microcell; and
a macrocell associated with the first microcell and the second microcell.

16. A user equipment (UE) comprising:
a receiver configured to receive a reconfiguration request from a macrocell that includes a unique counter that is assigned to a group of microcells;
one or more processors configured to encrypt a first user plane signaling message and a second user plane signaling message using the same user plane encryption key, wherein the user plane encryption key is derived in accordance with the unique counter; and
a transmitter configured to transmit the first user plane signaling message to a first microcell in the group of microcells during a first period in which the UE is communicatively coupled to the first microcell, and to transmit the second user plane signaling message to a second microcell in the group of microcells during a first period in which the UE is communicatively coupled to the second microcell.

17. The UE of claim 16, wherein the information in the reconfiguration request identifies an algorithm to be used by the UE for deriving the user plane encryption key and includes the unique counter to be used as an input into the algorithm.

* * * * *

UNITED STATES PATENT AND TRADEMARK OFFICE
CERTIFICATE OF CORRECTION

PATENT NO. : 10,412,056 B2
APPLICATION NO. : 15/213266
DATED : September 10, 2019
INVENTOR(S) : Ahmad Shawky Muhanna et al.

Page 1 of 1

It is certified that error appears in the above-identified patent and that said Letters Patent is hereby corrected as shown below:

On the Title Page

Item (54) and in the Specification, Column 1, Line 2, delete "ARCHITECTURE METHOD" and insert --ARCHITECTURE AND METHOD--.

Signed and Sealed this
Twenty-ninth Day of October, 2019

Andrei Iancu
*Director of the United States Patent and Trademark Office*